(12) United States Patent
Ishii et al.

(10) Patent No.: US 11,305,464 B2
(45) Date of Patent: Apr. 19, 2022

(54) VEHICLE INTERIOR BOARD AND METHOD FOR MANUFACTURING SAME

(71) Applicant: MORIDEN Co., Ltd., Tokyo (JP)

(72) Inventors: Junichi Ishii, Gunma (JP); Yoshitaka Maehara, Gunma (JP); Takumi Ono, Gunma (JP)

(73) Assignee: MORIDEN Co., Ltd., Tokyo (JP)

( * ) Notice: Subject to any disclaimer, the term of this patent is extended or adjusted under 35 U.S.C. 154(b) by 0 days.

(21) Appl. No.: 16/338,180

(22) PCT Filed: Dec. 28, 2016

(86) PCT No.: PCT/JP2016/089019
§ 371 (c)(1),
(2) Date: Mar. 29, 2019

(87) PCT Pub. No.: WO2018/122994
PCT Pub. Date: Jul. 5, 2018

(65) Prior Publication Data
US 2020/0023560 A1    Jan. 23, 2020

(51) Int. Cl.
*B29C 39/10*    (2006.01)
*B32B 15/095*    (2006.01)
(Continued)

(52) U.S. Cl.
CPC ............ *B29C 39/10* (2013.01); *B32B 15/095* (2013.01); *B29L 2007/002* (2013.01);
(Continued)

(58) Field of Classification Search
CPC ............ B29C 44/1214; B29C 44/1233; B29C 44/1242; B29C 44/1219; B29C 33/123; B29C 33/12; B29C 33/16
See application file for complete search history.

(56) References Cited

U.S. PATENT DOCUMENTS 4,014,967 A * 3/1977 Hattenberger ........ B29C 44/586
264/51
4,923,539 A * 5/1990 Spengler ................. B29C 33/18
156/212
(Continued)

FOREIGN PATENT DOCUMENTS

CN    1246822 A    3/2000
CN    1990229 A    7/2007
(Continued)

OTHER PUBLICATIONS

International Search Report dated Feb. 7, 2017 issued in corresponding International Patent Application No. PCT/JP2016/089019.

*Primary Examiner* — Niki Bakhtiari
*Assistant Examiner* — Emmanuel S Luk
(74) *Attorney, Agent, or Firm* — Troutman Pepper Hamilton Sanders LLP

(57) ABSTRACT

A vehicle interior board which has less deterioration and peeling near an end portion of a metal plate, has high quality, is thin, lightweight, and has high strength and excellent productivity. The vehicle interior board includes a pair of metal plates and a foamed polyurethane layer formed between the pair of metal plates. At the peripheral edge portion of the vehicle interior board, the foamed polyurethane layer covers peripheral end portions of the metal plates and is formed flush with outer surfaces of the metal plates. This makes it possible to suppress oxidation of the peripheral end portions which are cutting surfaces of the metal plates. Further, bonding is good between the metal plates and the foamed polyurethane layer. Further, it is possible to prevent peeling of the metal plates, chipping of the foamed polyurethane layer, and the like. Furthermore, it is easy to demold a vehicle interior board.

10 Claims, 8 Drawing Sheets

(51) Int. Cl.
*B29L 7/00* (2006.01)
*B29L 31/30* (2006.01)
*B32B 27/40* (2006.01)
*B60R 13/01* (2006.01)
*F16B 5/00* (2006.01)

(52) U.S. Cl.
CPC ........... *B29L 2031/30* (2013.01); *B32B 27/40* (2013.01); *B60R 13/01* (2013.01); *F16B 5/0004* (2013.01)

(56) References Cited

U.S. PATENT DOCUMENTS

| | | | | |
|---|---|---|---|---|
| 5,207,957 | A * | 5/1993 | Heath | B29C 44/1238 264/261 |
| 5,571,597 | A * | 11/1996 | Gallagher | B29C 39/10 296/70 |
| 6,403,195 | B1 * | 6/2002 | Montagna | B32B 5/26 156/242 |
| 6,413,347 | B1 * | 7/2002 | Hosaka | B29C 65/7847 156/245 |
| 6,474,976 | B1 * | 11/2002 | Oami | B29C 33/18 425/503 |
| 6,620,365 | B1 * | 9/2003 | Odoi | B29C 45/14377 264/261 |
| 9,598,120 | B2 * | 3/2017 | Ishii | B32B 5/022 |
| 9,731,439 | B2 * | 8/2017 | Maehara | B29C 44/1242 |
| 2002/0135161 | A1 * | 9/2002 | Lamb | B32B 5/02 280/728.3 |
| 2004/0169396 | A1 * | 9/2004 | Dooley | B29C 45/0053 296/146.7 |
| 2006/0029751 | A1 * | 2/2006 | Cowelchuk | B60R 13/02 428/31 |
| 2007/0090162 | A1 * | 4/2007 | Verhaeghe | B29C 70/24 228/101 |
| 2007/0148411 | A1 | 6/2007 | Yamada | |
| 2008/0107889 | A1 * | 5/2008 | Fox | B29C 45/14467 428/319.7 |
| 2010/0234082 | A1 * | 9/2010 | Hong | H04B 1/3833 455/575.7 |
| 2011/0121547 | A1 * | 5/2011 | Nogaret | B32B 27/32 280/728.3 |
| 2012/0074618 | A1 * | 3/2012 | Depierre | B29C 45/14065 264/478 |
| 2012/0100337 | A1 * | 4/2012 | Suzuki | B29C 44/128 428/116 |
| 2012/0249452 | A1 * | 10/2012 | Kitano | G06F 1/1656 345/173 |
| 2013/0143029 | A1 | 6/2013 | Yamada | |
| 2013/0344284 | A1 | 12/2013 | Ota | |
| 2015/0086759 | A1 | 3/2015 | Sumi et al. | |
| 2016/0354991 | A1 | 12/2016 | Sueoka | |
| 2017/0120506 | A1 * | 5/2017 | Bierlein | B29C 66/849 |
| 2017/0305046 | A1 * | 10/2017 | Fujisawa | B29C 44/58 |
| 2020/0164551 | A1 * | 5/2020 | Inoue | B29C 39/10 |

FOREIGN PATENT DOCUMENTS

| | | |
|---|---|---|
| CN | 102825693 A | 12/2012 |
| CN | 103442866 A | 12/2013 |
| DE | 102008002918 A1 | 1/2010 |
| EP | 1008430 A1 | 6/2000 |
| JP | 2002-144477 A | 5/2002 |
| JP | 2013-107588 A | 6/2013 |
| JP | WO2014/102866 A1 * | 7/2014 |
| JP | 2015-164763 A | 9/2015 |
| WO | WO2011001924 A1 * | 6/2011 |

* cited by examiner (A)

(B)

(A)

(B)

(A)

(B)

(A)

(B)

(C)

(A)

(B)

VEHICLE INTERIOR BOARD AND METHOD FOR MANUFACTURING SAME

CROSS REFERENCE TO RELATED APPLICATIONS

This is a U.S. national phase application under 35 U.S.C. § 371 of International Patent Application No. PCT/JP2016/089019, filed Dec. 28, 2016. The entire contents of these applications are hereby incorporated by reference.

TECHNICAL FIELD

The present invention relates to a vehicle interior board having a laminated structure including a pair of metal plates and a foamed polyurethane layer formed therebetween, and a method for manufacturing the same.

BACKGROUND

Typically, as the vehicle interior board, a floor board for automobiles including a pair of thin steel plates and a rigid foamed polyurethane layer sandwiched therebetween is known (for example, JP-A-2002-144477). This type of vehicle interior board is formed by reaction injection molding (RIM) including reacting foamable raw materials injected between a pair of steel plates set in a mold.

Specifically, a molding apparatus for manufacturing this type of vehicle interior board includes a lower mold and an upper mold for sandwiching the pair of steel plates. On an upper surface of the lower mold and a lower surface of the upper mold, shallow recesses having a planar shape conforming to the steel plate constituting the vehicle interior board is formed. Bottom surfaces of these recesses are setting surfaces for setting the steel plate. Then, the steel plates are respectively set on the setting surfaces of the lower mold and the upper mold. The upper mold is placed on the upper surface of the lower mold in this state. In this way, a molding space is formed between the pair of steel plates sandwiched between the upper mold and the lower mold. Note that the steel plate set in the upper mold is held by an electromagnetic force of an electromagnet or a vacuum action of a vacuum suction section provided in the upper mold.

Then, the liquid foamable raw materials containing polyol and isocyanate are supplied to the molding space formed between the pair of steel plates. Thereafter, the foamable raw materials are heated to a predetermined temperature. This causes a chemical reaction. At this time, foaming also occurs. Then, the rigid foamed polyurethane layer having a planar shape conforming to the planar shape of the steel plate is formed between the pair of steel plates. As a result, a thin, lightweight, high strength vehicle interior board including integrated the pair of steel plates and the rigid foamed polyurethane layer sandwiched therebetween is formed.

However, there have been points to be improved for the above-described vehicle interior board of the related art in order to improve reliability and durability by suppressing deterioration, peeling and the like of the metal plate, to reduce weight for improving fuel economy of automobiles and the like, and to improve productivity.

Specifically, in the above-described related art, the recesses formed in the lower mold and the upper mold, and the setting surface as the bottom surface thereof have a planar shape conforming to the planar shape of the steel plate. That is, the planar shape of the rigid foamed polyurethane layer after molding is also the same as the planar shape of the steel plate. Therefore, an end portion which is a cutting surface of the steel plate was exposed at a peripheral end portion of the vehicle interior board. That is, a main surface of the steel plate is subjected to surface treatment such as galvanizing or coating, whereas the cutting surface not subjected to the surface treatment of the steel plate is exposed at the peripheral end portion of the vehicle interior board. As a result, the end portion of the steel plate may be deteriorated by oxidation or the like.

There has also been a problem that peeling of the steel plate and chipping of the rigid foamed polyurethane layer tend to easily occur at a peripheral edge portion of the vehicle interior board. That is, peeling of the steel plate tends to occur starting from near a boundary between the steel plate exposed at the end portion of the vehicle interior board and the rigid foamed polyurethane layer. Therefore, as the steel plate peels off, the rigid foamed polyurethane layer is easily chipped. Further, when removing the vehicle interior board after molding from the recess of the lower mold or the upper mold, it is difficult to demold a vicinity of the end portion of the steel plate. Specifically, the end portion of the exposed steel plate is easily caught by the lower mold or the like. Therefore, there has been a possibility that the vicinity of the end portion of the steel plate is peeled off.

Further, the vacuum suction section disclosed in JP-A-2002-144477 has a structure of sucking and holding the steel plate by the vacuum action from a plurality of vacuum holes formed in the upper mold. This structure has a problem that the foamable raw materials tend to leak to an outer surface side of the steel plate and into the vacuum hole. That is, when the foamable raw materials are supplied to the molding space, the foamable raw materials are sucked by the vacuum action. The foamable raw materials which have leaked to the outer surface side of the steel plate is reacted and cured. As a result, the rigid foamed polyurethane adheres to the outer surface of the steel plate. Then, it is difficult to ensure good appearance and suitable surface strength in order to finish an outer surface of the vehicle interior board of high quality. Further, there is also a problem that it is difficult to demold the vehicle interior board after molding. Furthermore, the foamable raw materials which have entered the vacuum hole causes clogging or the like of the vacuum hole.

Further, in order to mount other components such as a handle or a hinge component on the vehicle interior board, it is necessary to form mounting holes or the like for mounting these components in the vehicle interior board. Typically, a step of forming the mounting holes or the like on the molded vehicle interior board has been separately performed after a step of integrally molding the vehicle interior board by using the rigid foamed polyurethane layer. Therefore, it has been desired to reduce the number of production steps and to improve efficiency of production.

Further, for example when thinning the vehicle interior board or adopting an aluminum plate instead of the steel plate in order to reduce weight of the vehicle interior board, there is a possibility that the strength of the vehicle interior board is reduced. If the strength of the vehicle interior board is insufficient near the mounting hole or the like for mounting other components on the vehicle interior board, there has been a possibility that other components cannot be properly fixed.

The present invention has been made in view of the above circumstances. An object of the present invention is to provide a vehicle interior board which has less deterioration and peeling in the vicinity of the end portion of the metal plate, has high quality, is thin, lightweight, and has high strength and excellent productivity, and a method for manufacturing the same.

SUMMARY

A vehicle interior board of the present invention includes a pair of metal plates; and a foamed polyurethane layer formed between the pair of metal plates, wherein at a peripheral edge portion, the foamed polyurethane layer covers peripheral end portions of the metal plates and is formed flush with outer surfaces of the metal plates.

A method for manufacturing a vehicle interior board of the present invention includes a step of molding a pair of metal plates respectively into predetermined shapes; a step of applying an epoxy resin-based coating agent to main surfaces respectively corresponding to inner surfaces of the pair of metal plates with; a step of forming a molding space between the pair of metal plates by sandwiching the pair of metal plates between a lower mold and an upper mold so that the main surfaces corresponding to the inner surfaces coated with the coating agent face each other; and a step of forming a foamed polyurethane layer by reacting raw materials of foamed polyurethane injected into the molding space, wherein a setting surface, which has a planar shape larger than that of the metal plate and on which the metal plate is set so that an outer surface of the metal plate abuts the setting surface, is formed in each of the lower mold and the upper mold, lower mold protuberances protruding from the setting surface are formed in the lower mold, in the step of molding the metal plates, positioning holes are formed in the metal plate, and in the step of forming the molding space, the metal plate is set so that the holes of the metal plate arranged on the lower mold side are fitted to the lower mold protuberances, and each of the pair of metal plates is disposed near a center of the setting surface.

The vehicle interior board of the present invention includes the pair of metal plates and the foamed polyurethane layer formed between the pair of metal plates. The peripheral end portion of the metal plate is covered with the foamed polyurethane layer. This makes it possible to suppress oxidation of the peripheral end portion which is the cutting surface of the metal plate.

Further, the peripheral end portion of the metal plate is covered with the foamed polyurethane layer. Thus, the bonding between the metal plate and the foamed polyurethane layer is good at the peripheral edge portion of the metal plate. As a result, peeling of the metal plate can be prevented.

Further, the peripheral edge portion of the vehicle interior board is surrounded by the foamed polyurethane layer formed flush with the outer surface of the metal plate. The peripheral edge portion of the vehicle interior board is formed of the foamed polyurethane layer. This makes it possible to round a peripheral corner portion of the vehicle interior board. This makes it possible to prevent peeling of the metal plate, chipping of the foamed polyurethane layer, and the like when the vehicle interior board is removed from the mold in a process for manufacturing the vehicle interior board. Therefore, it is easy to demold the vehicle interior board.

Further, according to the vehicle interior board of the present invention, the pair of metal plates is formed with mounting holes for mounting other components on the vehicle interior board. A reinforcing member may be disposed in the foamed polyurethane layer around the mounting hole. This increases rigidity and strength near the mounting hole. Therefore, it is possible to firmly fix other components such as the handle or the hinge to the vehicle interior board. Further, it is possible to reduce thickness or weight of the vehicle interior board while ensuring the rigidity and strength near the mounting hole.

The method for manufacturing the vehicle interior board according to the present invention includes: the step of molding the pair of metal plates respectively into predetermined shapes; the step of coating the main surfaces respectively corresponding to the inner surfaces of the pair of metal plates with the epoxy resin-based coating agent; the step of forming the molding space between the pair of metal plates by sandwiching the pair of metal plates between the lower mold and the upper mold so that the main surfaces corresponding to the inner surfaces coated with the coating agent face each other; and the step of forming the foamed polyurethane layer by reacting the raw materials of the foamed polyurethane injected into the molding space. The setting surfaces of the lower mold and the upper mold are formed to have the planar shape larger than that of the metal plate. In the step of forming the molding space, each of the pair of metal plates is disposed so that the main surface corresponding to the outer surface of the metal plate abuts a vicinity of the center of the setting surface. Thus, at the peripheral edge portion of the vehicle interior board, the foamed polyurethane layer covers the peripheral end portion of the metal plate and is formed flush with the outer surface of the metal plate. This makes it possible to suppress oxidation of the peripheral end portion of the metal plate. Further, the peripheral end portion of the metal plate is bonded to the foamed polyurethane layer. Thus, bonding strength between the metal plate and the foamed polyurethane layer is increased. Therefore, peeling of the metal plate can be prevented.

Further, the peripheral edge portion of the vehicle interior board is formed of the foamed polyurethane layer. This makes it possible to round the peripheral corner portion of the vehicle interior board. This makes it possible to prevent peeling of the metal plate, chipping of the foamed polyurethane layer, and the like. Furthermore, it is easy to demold the vehicle interior board.

The lower mold is formed with lower mold protuberances protruding from the setting surface. Further, in the step of molding the metal plates, a positioning hole is formed in the metal plate. Further, in the step of forming the molding space, the metal plate is set so that the holes of the metal plate arranged on the lower mold side are fitted to the lower mold protuberances. Thus, the metal plate can be easily and accurately positioned. Therefore, it is possible to accurately form the foamed polyurethane layer covering the peripheral end portion of the metal plate on the peripheral edge portion of the vehicle interior board with a predetermined width dimension.

Further, according to the method for manufacturing the vehicle interior board of the present invention, in the step of forming the foamed polyurethane layer, the mounting holes for mounting other components on the vehicle interior board may be formed at positions corresponding to the lower mold protuberances. That is, in the step of molding the vehicle interior board, the lower mold protuberances for positioning are used. In this way, the mounting holes for mounting other components on the vehicle interior board can be formed at the same time. Thus, it is not necessary to separately perform the step of forming the mounting holes after molding the vehicle interior board. Therefore, productivity is improved.

According to the method for manufacturing the vehicle interior board of the present invention, at least one of the lower mold protuberances may abut the main surface corresponding to the inner surface of the metal plate disposed on the upper mold side. Thus, it is possible to set two metal plates on the lower mold with a predetermined interval. Therefore, it is easy to set the metal plate. It is also possible to reduce or omit electromagnets or vacuum holes provided to hold the metal plate on the upper mold.

Further, according to the method for manufacturing the vehicle interior board of the present invention, at least one of the lower mold protuberances may be formed to reach the upper mold. Further, in the step of molding the metal plate, the hole may be formed in the metal plate disposed on the upper mold side corresponding to a position of the lower mold protuberance reaching the upper mold. Thus, in the step of forming the foamed polyurethane layer, the mounting hole penetrating from one outer surface to the other outer surface of the vehicle interior board can be formed in the vehicle interior board.

Further, according to the method for manufacturing the vehicle interior board of the present invention, an upper mold protuberance protruding from the setting surface and abutting the lower mold protuberance may be formed on the upper mold corresponding to the position of the lower mold protuberance reaching the upper mold. Further, in the step of forming the molding space, the metal plate may be set so that the holes of the metal plate arranged on the upper mold side are fitted to the upper mold protuberances. Thus, the metal plate disposed on the upper mold side is easily and accurately positioned.

Further, according to the method for manufacturing the vehicle interior board of the present invention, at least one of the lower mold protuberances reaching the upper mold may have a step portion which abuts the main surface corresponding to the inner surface of the metal plate disposed on the upper mold side. Further, the lower mold protuberance having the step portion may be fitted into the hole formed in the metal plate disposed on the upper mold side. Thus, it is possible to set two metal plates in precise positions with a predetermined interval on the lower mold.

Further, according to the method for manufacturing the vehicle interior board of the present invention, the setting surface of at least one of the upper mold and the lower mold may be provided with a vacuum hole opening to the setting surface and a sealing member surrounding a periphery of the vacuum hole. In the step of forming the molding space, an inside of the vacuum hole may be depressurized. Thus, the metal plate is sucked in a region surrounded by the sealing member. The metal plate set on the setting surface is held in the lower mold or the upper mold. Thus, the metal plate is in close contact with the lower mold or the upper mold. In this way, the metal plate can be held in a predetermined position. This makes it possible to suppress a leakage of the foamed polyurethane that may adhere to the outer surface of the metal plate. Thus, it is possible to manufacture the vehicle interior board of high quality. Specifically, the metal plate made of a non-magnetic material such as aluminum can be suitably held. Therefore, it is possible to form a lightweight and high strength vehicle interior board. In addition, clogging or the like of the vacuum hole by the foamed polyurethane can be suppressed.

Further, according to the method for manufacturing the vehicle interior board of the present invention, in the step of forming the molding space, a reinforcing member may be disposed around the hole fitted to the lower mold protuberance between the pair of metal plates. In the step of forming the foamed polyurethane layer, the reinforcing member may be fixed in the foamed polyurethane layer. Thus, the lower mold protuberance can be used for positioning. Then, the reinforcing member can be disposed in a precise position near the hole. Therefore, the rigidity and strength around the hole can be increased. This hole can be used as the mounting hole for mounting other components on the vehicle interior board. Other components such as the handle or the hinge can be firmly fixed to the vehicle interior board. Thus, it is possible to ensure the rigidity and strength near the mounting hole and at the same time to reduce the thickness and weight of the vehicle interior board. Further, since it is not necessary to separately mount other components or the like for increasing the strength in a subsequent step, the productivity is improved.

BRIEF DESCRIPTION OF THE DRAWINGS

FIG. 5A is a view showing a state where a pair of metal plates is set in the lower mold and the upper mold. FIG. 5B is a view showing a state where a molding space is formed. FIG. 5C is a view showing a state where a foamed polyurethane layer is formed.

DETAILED DESCRIPTION

Hereinafter, a vehicle interior board and a method for manufacturing the same according to an embodiment of the present invention will be described in detail with reference to the drawings.

Figure 1:
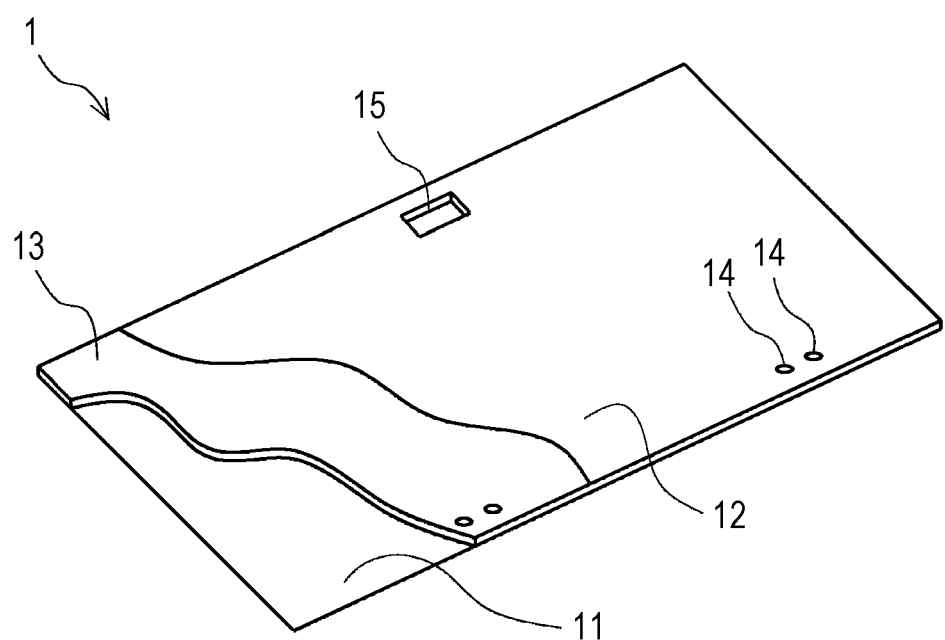
FIG. 1 is a perspective view showing a vehicle interior board according to an embodiment of the present invention.
Figure 2:
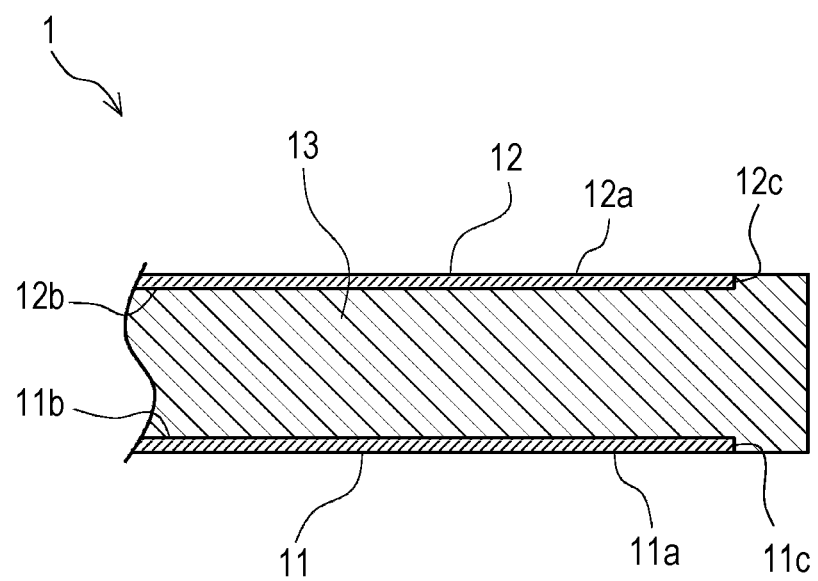
FIG. 2A is a cross-sectional view showing a peripheral edge portion of the vehicle interior board according to the embodiment of the present invention.
FIG. 2B is a cross-sectional view showing another example of the peripheral edge portion of the vehicle interior board according to the embodiment of the present invention.
Figure 2:
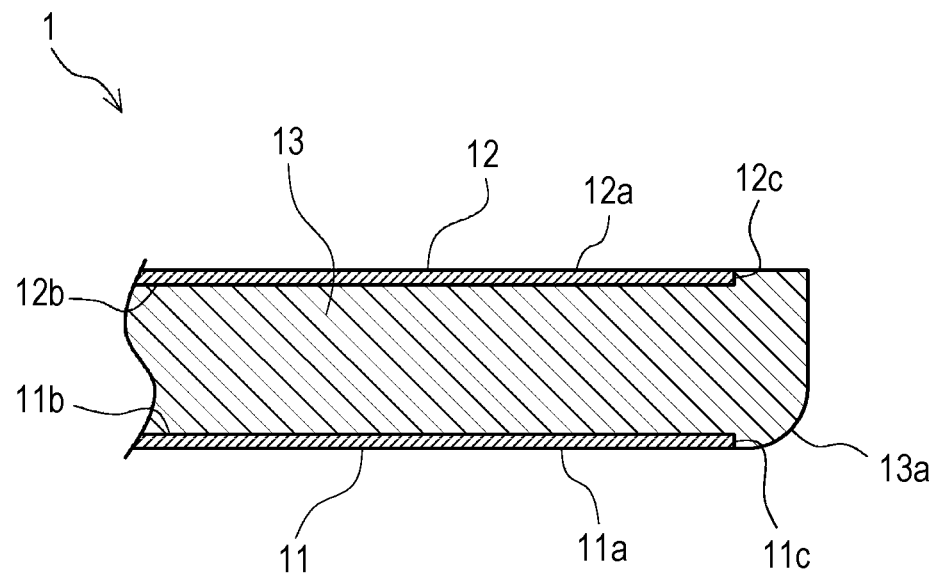
Figure 3:
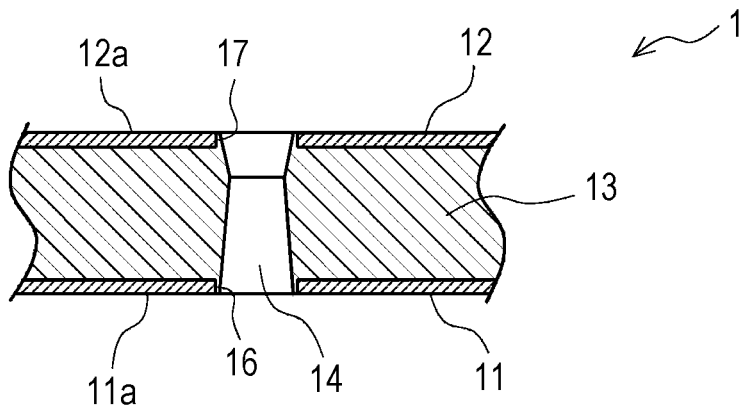
FIG. 3A is a cross-sectional view showing a vicinity of a mounting hole of the vehicle interior board according to the embodiment of the present invention.
FIG. 3B is a cross-sectional view showing another example of the vicinity of the mounting hole of the vehicle interior board according to the embodiment of the present invention.
FIG. 3C is a cross-sectional view showing still another example of the vicinity of the mounting hole.
Figure 3:
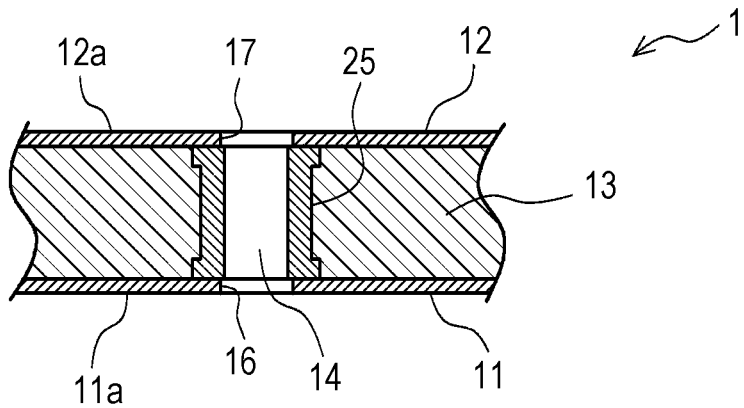
Figure 3:
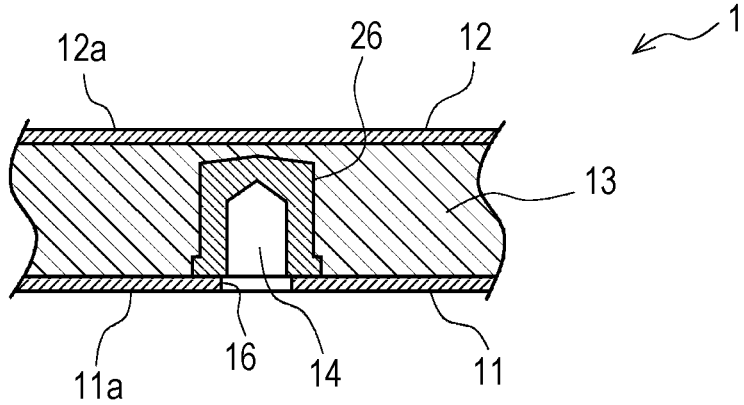
Figure 4:
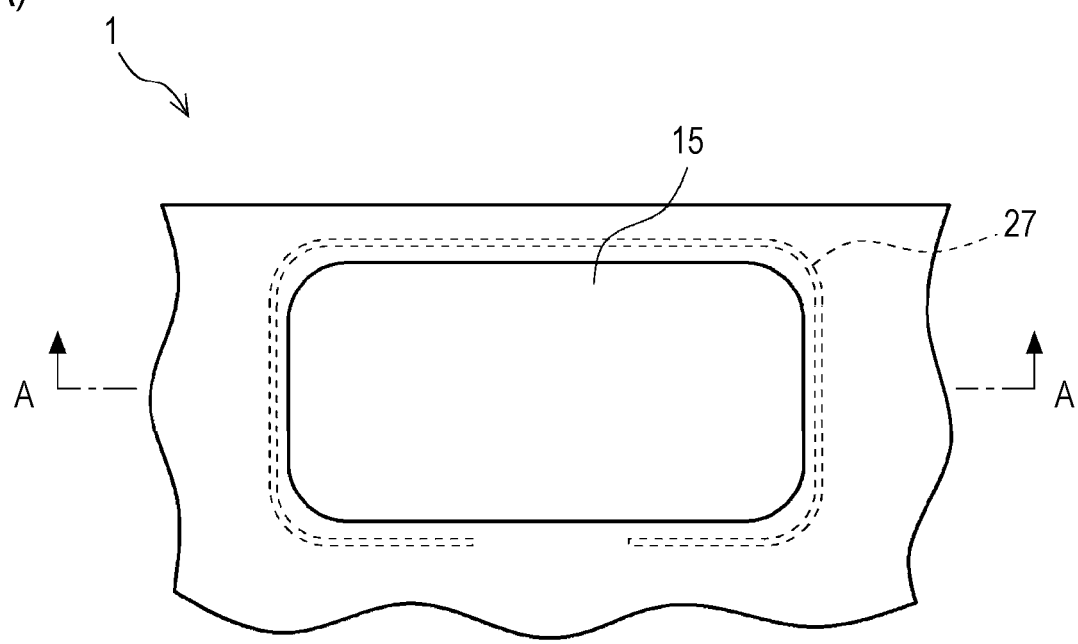
FIG. 4A is a plan view showing a vicinity of a handle hole of the vehicle interior board according to the embodiment of the present invention.
FIG. 4B is a cross-sectional view showing the vicinity of the handle hole taken along a line A-A.
Figure 4:
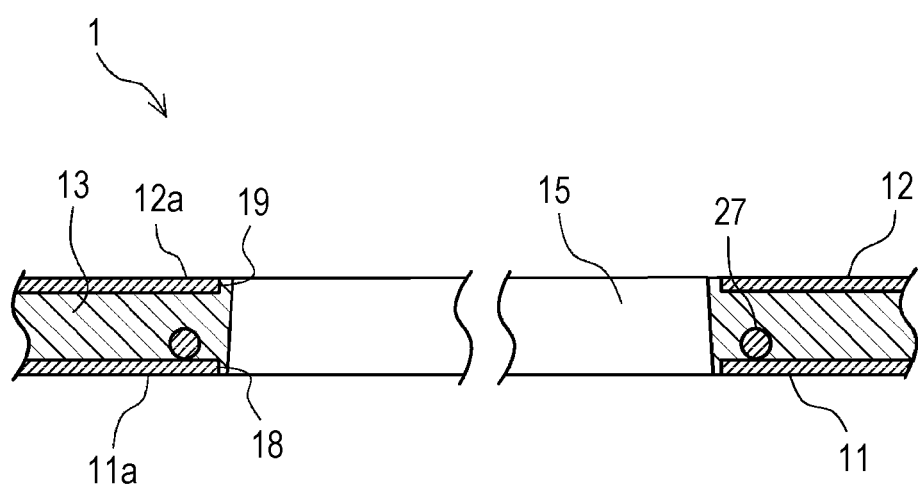
Figure 5:
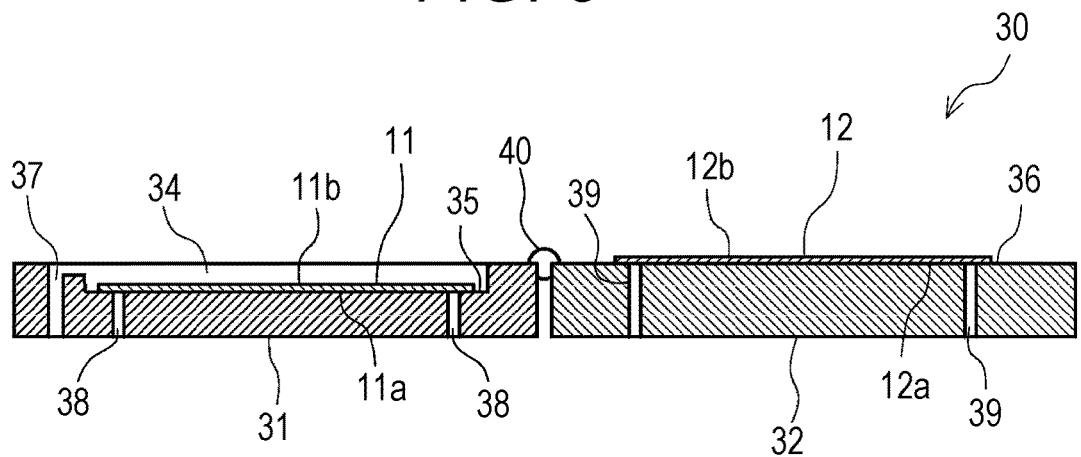
FIGS. 5A to 5C are diagrams showing a process for manufacturing the vehicle interior board according to the embodiment of the present invention.
Figure 5:
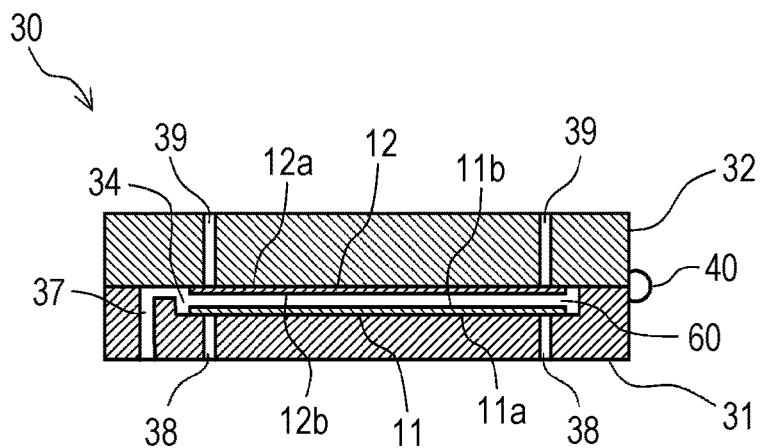
Figure 5:
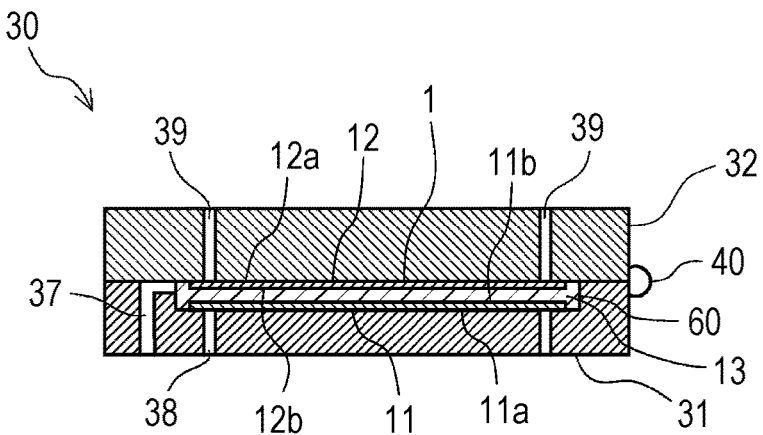
Figure 6:
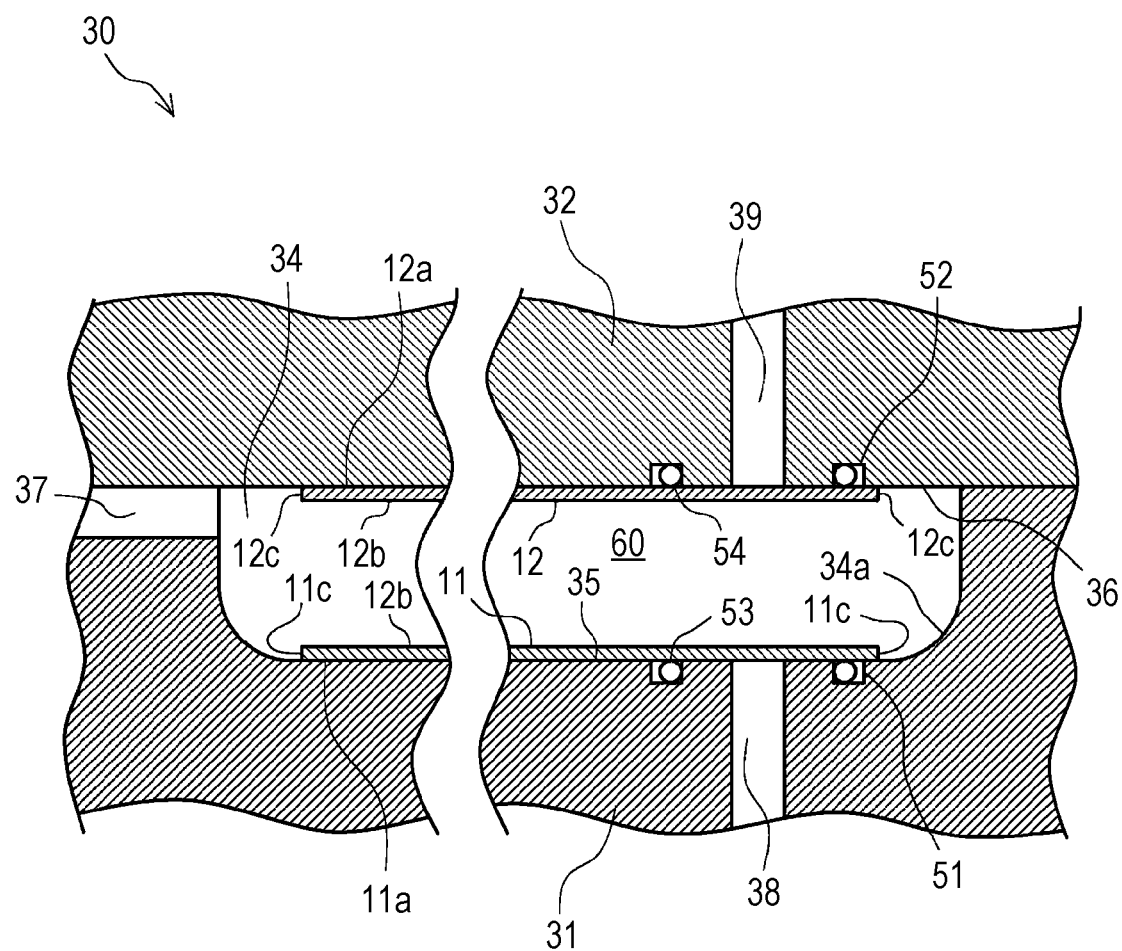
FIG. 6A is a cross-sectional view showing a vicinity of peripheral end portions of the metal plates set in the lower mold and the upper mold in the process for manufacturing the vehicle interior board according to the embodiment of the present invention.
FIG. 6B is a plan view showing a vicinity of a vacuum hole of the lower mold.
Figure 6:
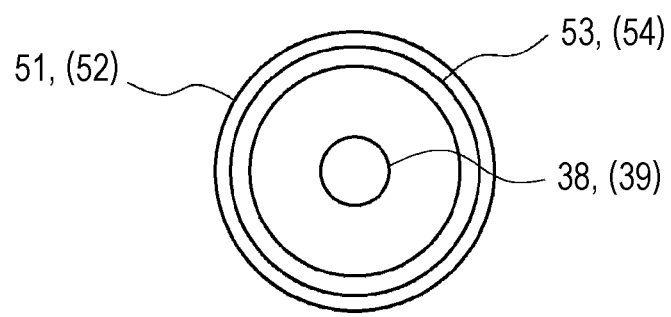
Figure 7:
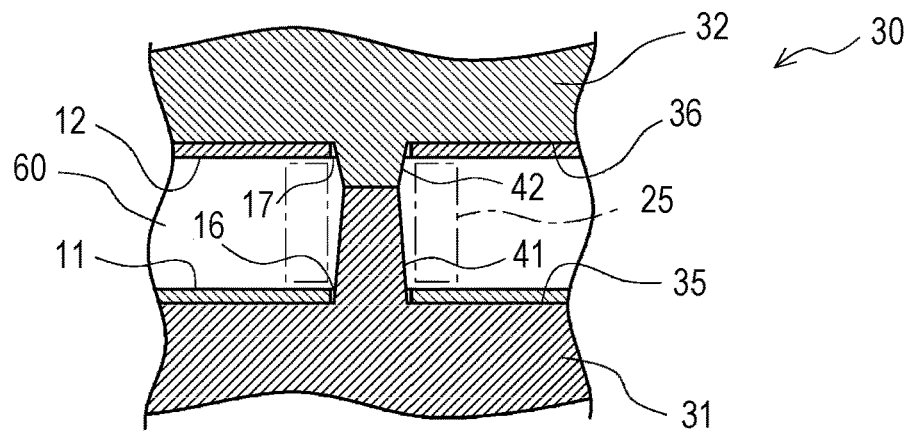
FIG. 7A is a cross-sectional view showing a vicinity of a lower mold protuberance and an upper mold protuberance in the state where the molding space is formed in the process for manufacturing the vehicle interior board according to the embodiment of the present invention.
FIG. 7B is a cross-sectional view of the vicinity of the lower mold protuberance showing another example of the lower mold protuberance.
FIG. 7C is a cross-sectional view of the vicinity of the lower mold protuberance showing still another example of the lower mold protuberance.
Figure 7:
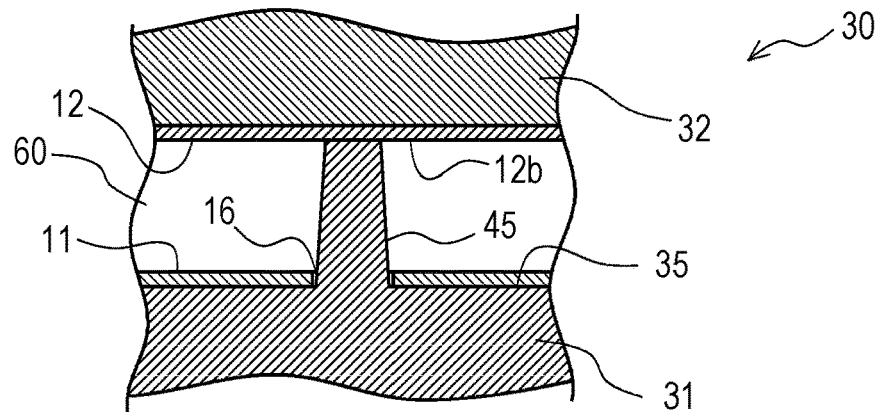
Figure 7:
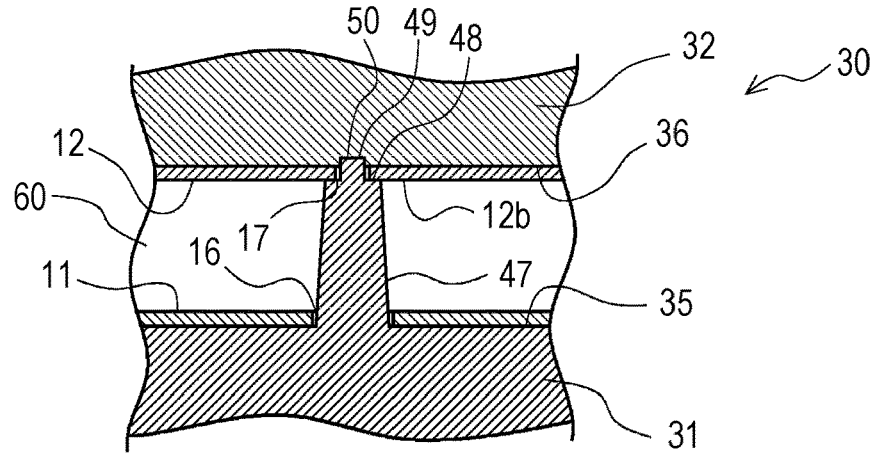
Figure 8:
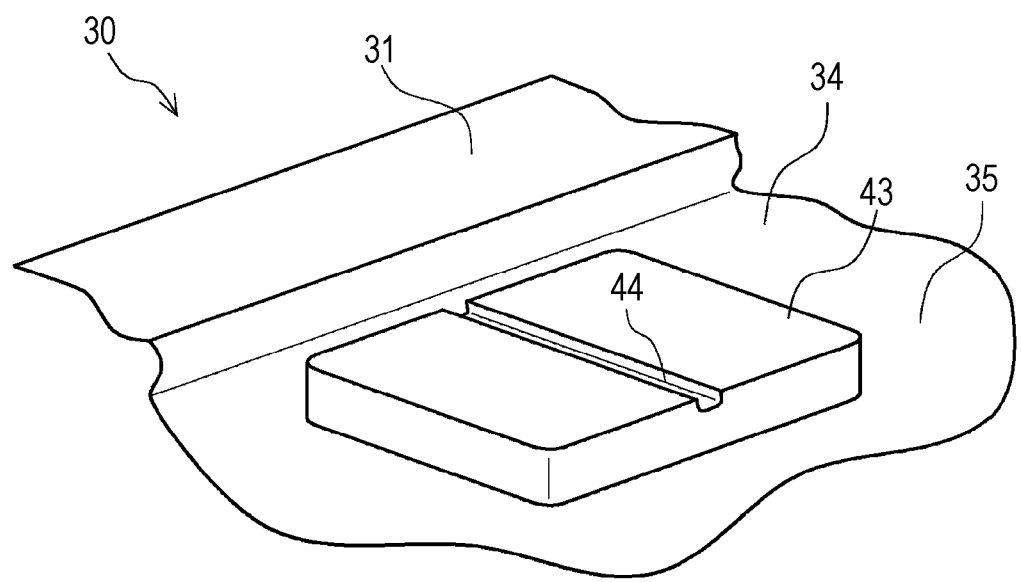
FIG. 8A is a perspective view showing a vicinity of a handle hole forming portion of the lower mold of a molding apparatus for the vehicle interior board according to the embodiment of the present invention.
FIG. 8B is a cross-sectional view showing the vicinity of the handle hole forming portion in the state where the molding space is formed.
Figure 8:
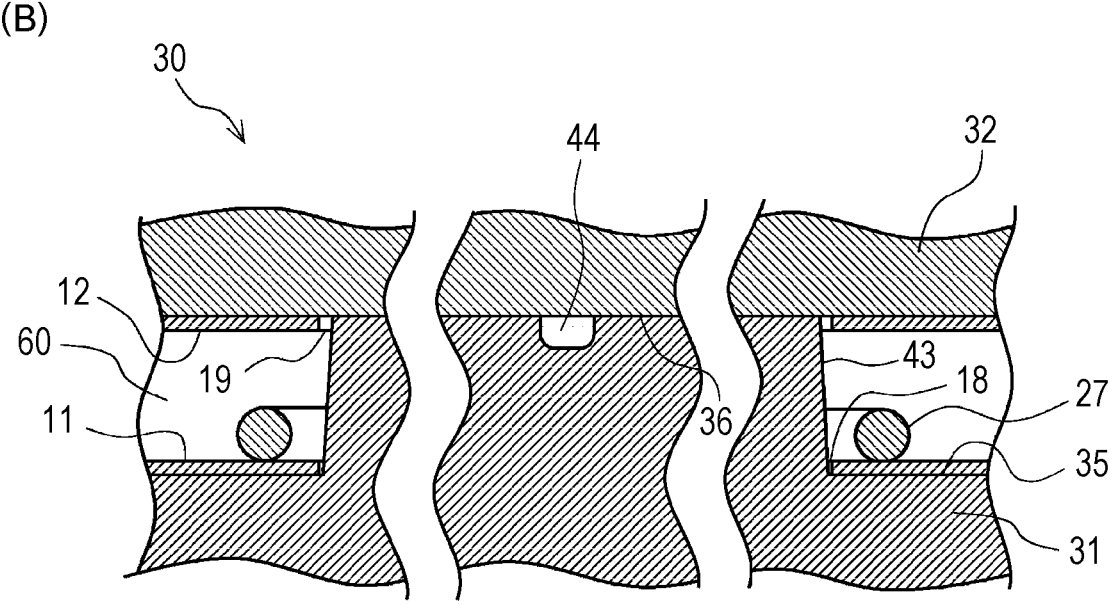

First, with reference to FIGS. 1 to 4B, a structure of a vehicle interior board 1 according to the embodiment of the present invention will be described in detail. FIG. 1 is a perspective view showing a schematic structure of the vehicle interior board 1. The vehicle interior board 1 is used, for example, as a floor plate or the like of a cargo room of an automobile.

As shown in FIG. 1, the vehicle interior board 1 includes a pair of metal plates 11, 12 and a foamed polyurethane layer 13 formed between the metal plate 11 and the metal plate 12. The vehicle interior board 1 is a plate-like body having a multilayer structure integrally molded by a manufacturing method described later. Thickness of the vehicle interior board 1 is, for example, about 3 to 20 mm. The vehicle interior board 1 is molded into a predetermined peripheral shape depending on an application.

The pair of metal plates 11, 12 is a substantially flat aluminum plate having a thickness of, for example, about 0.1 to 0.3 mm, preferably about 0.12 to 0.15 mm. For the sake of explanation, the figures show the thicknesses of the metal plates 11 and 12 being enlarged. Aluminum plates are used as the metal plates 11 and 12. Thus, the vehicle interior board 1 is lightweight and has high strength. Further, the metal plates 11 and 12 may be formed to have a predetermined uneven shape, for example, such as a waveform. This makes it possible to reduce weight of the vehicle interior board 1 while ensuring the strength. As the metal plates 11 and 12, other metal plates such as a galvanized steel plate or various coated steel plates may be used. When the steel plates are used as the metal plates 11 and 12, the metal plates 11 and 12 preferably have a thickness of about 0.07 to 0.3 mm.

The vehicle interior board 1 is formed with mounting holes 14, a handle hole 15, other mounting holes (not shown), and the like for mounting other components (not shown) such as a hinge or a handle. The mounting holes 14, the handle hole 15, and the like are formed in a step of integrally molding the vehicle interior board 1 by forming the foamed polyurethane layer 13. Details will be described below.

Although not shown, a carpet or the like is attached to an outer surface of the vehicle interior board 1 as a skin material for surface finishing depending on the application. Examples of the skin material to be used include a nonwoven fabric made of polyethylene terephthalate (PET) and the like. As the skin material, the nonwoven fabric, a textile fabric, other various sheet materials or the like made of other fibers or the like may be used.

FIG. 2A is a cross-sectional view showing a schematic structure of a peripheral edge portion of the vehicle interior board 1. As shown in FIG. 2A, the foamed polyurethane layer 13 has a larger planar shape than that of the metal plates 11 and 12. The foamed polyurethane layer 13 protrudes outwardly from peripheral end portions 11c, 12c of the metal plates 11, 12 at the peripheral edge portion of the vehicle interior board 1.

The peripheral end portions 11c, 12c of the metal plates 11, 12 are covered with the foamed polyurethane layer 13. That is, the foamed polyurethane layer 13 has a portion formed outside the peripheral end portions 11c, 12c of the metal plates 11, 12. The foamed polyurethane layer 13 is formed so that an upper surface and a lower surface of the portion are respectively flush with outer surfaces 11a, 12a of the metal plates 11, 12.

In this way, the peripheral end portions 11c, 12c of the metal plates 11, 12 are covered with the foamed polyurethane layer 13. Thus, it is possible to suppress deterioration due to oxidation or the like of the peripheral end portions 11c, 12c which are cutting surfaces of the metal plates 11, 12. Further, the metal plates 11, 12 have good bonding with the foamed polyurethane layer 13 at the peripheral end portions 11c, 12c. Therefore, peeling of the metal plates 11 and 12 can be prevented.

FIG. 2B is a cross-sectional view showing another example of the peripheral edge portion of the vehicle interior board 1. As described above, the peripheral edge portion of the vehicle interior board 1 is surrounded by the foamed polyurethane layer 12. With such a structure, as shown in FIG. 2B, a peripheral corner portion of the vehicle interior board 1 is rounded. Thus, a chamfered portion 13a can be formed.

Since the chamfered portion 13a is formed, it is possible to prevent peeling of the metal plates 11 and 12, chipping of the foamed polyurethane layer 13, and the like when the vehicle interior board 1 is removed from the mold in a process for manufacturing the vehicle interior board 1. Thus, it is easy to demold the vehicle interior board 1. Note that a shape of the chamfered portion 13a is not limited to a rounded shape. It may be a chamfered shape of attaching a flat surface to the peripheral corner portion. Further, chamfered portions 13a may be formed at corner portions on upper and lower surface sides of the vehicle interior board 1. Further, as shown in FIG. 2A, it is of course also possible to configure so that the chamfered portions 13a is not formed.

FIG. 3A is a cross-sectional view showing a schematic structure near the mounting hole 14 of the vehicle interior board 1. FIG. 3B is a cross-sectional view showing another example of the schematic structure near the mounting hole 14. FIG. 3C is a cross-sectional view showing still another example of the schematic structure near the mounting hole 14.

As shown in FIG. 3A, in the mounting hole 14, other components (not shown) such as the hinge are mounted on the vehicle interior board 1. The mounting hole 14 is formed, for example, as a hole penetrating from one outer surface 11a to the other outer surface 12a on an opposite side thereof. A fastener or the like (not shown) such as a screw or a rivet for fixing other components is inserted through the mounting hole 14.

Further, as shown in FIG. 3B, a grommet 25 or the like as a reinforcing member may be disposed around the mounting hole 14. The grommet 25 may also have a function as a fastening member in addition to a function as the reinforcing member.

Specifically, the grommet 25 is, for example, a substantially cylindrical member made of synthetic resin, metal, or the like. A tapping screw or the like (not shown) may be threaded into an inner peripheral surface of the grommet 25. Further, the grommet 25 may be a nut or the like having a female thread formed to be threaded with the screw or the like (not shown). Furthermore, the grommet 25 may be an engaging member or the like having an engaging portion formed to be engaged with another grommet or the like (not shown).

By disposing the grommet 25 in this way, rigidity and strength near the mounting hole 14 is increased. Further, the mounting hole 14 and the fastener or the like fixed thereto are strongly joined. Therefore, other components can be firmly fixed to the vehicle interior board 1. Further, by ensuring the rigidity and strength near the mounting hole 14 by the grommet 25 or the like, it is possible to reduce the thickness or weight of the vehicle interior board 1.

Further, the mounting hole 14 is not limited to the hole penetrating from the one outer surface 11a to the other outer surface 12a of the vehicle interior board 1. As shown in FIG. 3C, it may be a hole which does not penetrate. Also when the mounting hole 14 is formed as the hole not penetrating, a grommet 26 or the like as the reinforcing member or the fastening member may be disposed around the mounting hole 14.

FIG. 4A is a plan view showing a vicinity of the handle hole 15 of the vehicle interior board 1. FIG. 4B is a cross-sectional view showing the vicinity of the handle hole 15, that is, a cross-section taken along a line A-A shown in FIG. 4A. As shown in FIGS. 4A and 4B, the vehicle interior board 1 is formed with the handle hole 15 which is a mounting hole for mounting other components such as the handle (not shown). A reinforcing metal fitting 27 as the reinforcing member is disposed in the foamed polyurethane layer 13 around the handle hole 15 so as to surround the handle hole 15.

The reinforcing metal fitting 27 is, for example, a member having a substantially C shape in a plan view formed by bending a bar or the like made of metal such as steel or the like. By disposing the reinforcing metal fitting 27 around the handle hole 15, the rigidity and strength near the handle hole 15 can be increased.

Next, referring to FIGS. 5A to 8B, a molding apparatus 30 of the vehicle interior board 1 and the manufacturing method will be described in detail.

FIGS. 5A to 5C are diagrams showing the process for manufacturing the vehicle interior board 1. FIG. 5A is a view showing a state where a pair of metal plates 11, 12 are set in a lower mold 31 and an upper mold 32. FIG. 5B is a view showing a state where a molding space 60 is formed. FIG. 5C is a view showing a state where the foamed polyurethane layer 13 is formed.

First, as the process for manufacturing the vehicle interior board 1, a step of molding the metal plates 11, 12 is performed. Specifically, for example, the pair of metal plates 11 and 12 are respectively cut into predetermined shapes, for example, by press shearing processing, laser processing or the like.

Next, a coating step using a coating agent is performed. In the coating step using the coating agent, one main surface of each of the pair of metal plates 11, 12 is coated with an epoxy resin-based coating agent. The one main surface coated with the coating agent is a main surface corresponding to inner surfaces 11b, 12b facing the foamed polyurethane layer 13 side when the vehicle interior board 1 is formed. Then, a drying step of drying the applied coating agent is performed. Thus, the coating agent is dried.

Next, as shown in FIG. 5A and FIG. 5B, a step of forming the molding space 60 is performed. In the step of forming the molding space 60, as shown in FIG. 5A, the metal plates 11, 12 coated with the coating agent are first set in the lower mold 31 and the upper mold 32 of the molding apparatus 30 which is a RIM molding apparatus.

Here, the molding apparatus 30 has the lower mold 31 and the upper mold 32 connected to the lower mold 31 so as to be freely opened and closed via a hinge portion 40. A recess 34 having a larger planar shape than that of the metal plate 11 is formed on an upper surface of the lower mold 31 of the molding apparatus 30. A bottom surface of the recess 34 corresponds to a setting surface 35 on which the metal plate 11 is set. The metal plate 11 is set on the setting surface 35 so that a main surface corresponding to the outer surface 11a of the metal plate 11, that is, the main surface opposite to the inner surface 11b coated with the coating agent abuts a substantial center of the setting surface 35.

A setting surface 36 having a larger planar shape than that of the metal plate 12 is formed in the upper mold. The metal plate 12 is set on the setting surface 36 so that a main surface corresponding to the outer surface 12a of the metal plate 12, that is, the main surface opposite to the inner surface 12b coated with the coating agent abuts a substantial center of the setting surface 36.

Then, an inside of a vacuum hole 38 opening to the setting surface 35 of the lower mold 31 and an inside of a vacuum hole 39 opening to the setting surface 36 of the upper mold 32 are depressurized by a vacuum apparatus (not shown). Thus, the metal plates 11 and 12 are respectively held in the lower mold 31 and the upper mold 32. When magnetic materials, for example, such as steel plates are used as the metal plates 11 and 12, the metal plates 11 and 12 may be held by utilizing a magnetic force of an electromagnet.

Next, as shown in FIG. 5B, the upper mold is closed and placed on the upper surface of the lower mold. Thus, the pair of metal plates 11, 12 are sandwiched between the lower mold 31 and the upper mold 32 so that the main surfaces corresponding to the inner surfaces 11b, 12b coated with the coating agent face each other. Then, the molding space 60 is formed between the metal plates 11 and 12.

Then, as shown in FIG. 5C, a liquid mixed material containing isocyanate and polyol as liquid raw materials of foamed polyurethane is injected into the molding space 60 via an injection port 37. Thus, a step of forming the foamed polyurethane layer 13 is performed.

Here, the lower mold 31 and the upper mold 32 are maintained at a predetermined temperature, for example, 60 to 80° C. by a heating section (not shown). Thus, the liquid raw materials injected into the molding space 60 is heated in the molding space 60. As a result, the liquid raw materials undergo a chemical reaction, and are foamed and cured. As a result, the foamed polyurethane layer 13 is formed.

In this way, the liquid raw materials react and are foamed and cured to form the foamed polyurethane layer 13. Thus, the metal plates 11, 12 are strongly bonded using the foamed polyurethane layer 13 as a bonding member. In this way, the integrated vehicle interior board 1 is molded.

As described above, the inner surfaces 11b, 12b of the metal plates 11, 12 are previously coated with the epoxy resin-based coating agent. Thus, the bonding between the foamed polyurethane layer 13 and the metal plates 11, 12 is strengthened.

After molding of the foamed polyurethane layer 13 is completed, holding of the metal plates 11, 12 by the vacuum holes 38, 39 is released. Then, the upper mold 32 is opened, and the vehicle interior board 1 is removed from the lower mold 31.

Through the above steps, the vehicle interior board 1 having a laminated structure in which the pair of metal plates 11, 12 and the foamed polyurethane layer 13 are integrated is completed. Thereafter, an appropriate skin material or the like is attached to the outer surfaces 11a, 12a of the vehicle interior board 1 depending on each application. Further, other components and the like are mounted on the vehicle interior board 1. In this way, products such as floor boards used for vehicles and the like are completed.

FIG. 6A is a cross-sectional view showing a vicinity of peripheral end portions 11c, 12c of the metal plates 11, 12 in the state where the molding space 60 is formed. FIG. 6B is a plan view showing a vicinity of the vacuum hole 38 of the lower mold 31.

As described above, the setting surfaces 35, 36 of the lower mold 31 and the upper mold 32 are formed so that the setting surface has a larger planar shape than that of the metal plates 11, 12. In the step of forming the molding space 60, the metal plates 11, 12 are respectively arranged near the center of the setting surfaces 35, 36. That is, in the state where the molding space 60 is formed, the peripheral end portions 11c and 12c are exposed in the molding space 60 instead of abutting the lower mold 31 and the upper mold 32.

Thus, in the step of forming the foamed polyurethane layer 13 (see FIGS. 2A, 2B) with the liquid raw materials injected into the molding space 60, the foamed polyurethane layer 13 covers the peripheral end portions 11c, 12c of the metal plates 11, and is formed flush with the outer surfaces 11a, 12a of the metal plates 11, 12. Thus, it is possible to suppress oxidation of the peripheral end portions 11c, 12c of the metal plates 11, 12. In addition, bonding strength between the metal plates 11, 12 and the foamed polyurethane layer 13 is increased. As a result, peeling or the like of the metal plates 11, 12 can be prevented.

A peripheral corner portion 34a of the recess 34 of the lower mold 31 may be rounded. Thus, as shown in FIG. 2B, the chamfered portion 13a can be formed at the peripheral corner portion of the vehicle interior board 1. As a result, it is possible to prevent peeling of the metal plates 11, 12, chipping of the foamed polyurethane layer 13, and the like. In addition, it is possible to facilitate demolding of the vehicle interior board 1.

As shown in FIGS. 6A and 6B, the vacuum holes 38 and 39 opening to the setting surfaces 35 and 36 are respectively formed in the setting surfaces 35 and 36 of the lower mold 31 and the upper mold 32. O-ring grooves 51, 52 surrounding the vacuum holes 38, 39 are formed around the vacuum holes 38, 39. O-rings 53, 54 as sealing members are mounted in the O-ring grooves 51, 52. The vacuum holes 38, 39 and the O-rings 53, 54 surrounding them are formed in a plurality of places and surround the metal plates 11, 12. Further, the vacuum holes 38, 39 and the O-rings 53, 54 are arranged at positions corresponding to peripheral edge portions of the metal plates 11, 12 corresponding to peripheral shapes of the metal plates 11, 12.

With such a structure, in a step of setting the metal plates 11, 12, the inside of the vacuum hole 38, is depressurized. Then, the metal plates 11, 12 are sucked in a region surrounded by the O-rings 53, 54. Then, the metal plates 11, 12 are held in the lower mold 31 or the upper mold 32.

Thus, it is possible to hold the metal plates 11, 12 in close contact with the lower mold 31 or the upper mold 32 in a predetermined position, thereby suppressing a leakage of the foamed polyurethane that may adhere to the outer surfaces 11a, 12a of the metal plates 11, 12. Therefore, it is possible to manufacture a high-quality vehicle interior board 1.

Further, suction by the vacuum holes 38, 39 surrounded by the O-rings 53, 54 is utilized. Thus, the metal plates 11 and 12 made of a non-magnetic material such as aluminum can be suitably held. Therefore, it is possible to form the vehicle interior board 1 which is lightweight and high in strength. Further, the O-rings 53, 54 provided around the vacuum holes 38, 39 suppress clogging or the like of the vacuum holes 38, 39 caused by the foamed polyurethane.

FIG. 7A is a cross-sectional view of a vicinity of a lower mold pin portion 41 and a vicinity of an upper mold pin portion 42 in a state where the molding space 60 is formed in the process for manufacturing the vehicle interior board 1. As shown in FIG. 7A, the lower mold 31 is formed with the lower mold pin portion 41 which protrudes upward from the setting surface 35 as the lower mold protuberance. The lower mold pin portion 41 is formed to have an upper portion of a smaller diameter than that of a lower portion thereof. That is, the lower mold pin portion 41 is a projection having a substantially truncated cone shape.

Similarly, the upper mold 32 is formed with the upper mold pin portion 42 which protrudes, as an upper mold protuberance, downward from the setting surface 36 corresponding to a position of the lower mold pin portion 41 and abuts the lower mold pin portion 41. The upper mold pin portion 42 is formed to have a lower portion of a smaller diameter than that of an upper portion thereof. That is, the upper mold pin portion 42 is a projection having a substantially truncated cone shape. In this way, the lower mold pin portion 41 and the upper mold pin portion 42 are formed in a substantially truncated cone shape. Thus, it is easy to set the metal plates 11 and 12 described later. In addition, demolding after molding is also easy.

In the step of molding the metal plates 11, 12, a positioning hole 16 is formed in the metal plate 11. Further, a positioning hole 17 is formed in the metal plate 12. In the step of forming the molding space 60, the metal plate 11 is set so that the hole 16 of the metal plate 11 disposed on the lower mold 31 side is fitted to the lower mold pin portion 41. Similarly, the metal plate 12 is set so that the hole 17 of the metal plate 12 disposed on the upper mold 32 side is fitted to the upper mold pin portion 42.

As described above, the lower mold pin portion 41 and the upper mold pin portion 42 are formed in a substantially truncated cone shape. Therefore, operation of fitting the holes 16, 17 to the lower mold pin portion 41 and the upper mold pin portion 42 is easy. With the above structure, it is possible to easily and accurately position the metal plates 11, 12 respectively arranged near the centers of the setting surfaces 35, 36. That is, as shown in FIG. 6A, in a metal plate arranging method in which the peripheral end portions 11c, 12c of the metal plates 11, 12 do not abut the lower mold 31 and the upper mold 32, the metal plates 11, 12 can be set at accurate positions with respect to the setting surfaces 35, 36. Thus, it is possible to accurately form the foamed polyurethane layer 13 (see FIG. 2) covering the peripheral end portions 11c, 12c of the metal plates 11, 12 on the peripheral edge portion of the vehicle interior board 1 with a predetermined width dimension.

Further, as shown in FIG. 7A, the metal plates 11, 12 are positioned by the lower mold pin portion 41 and the upper mold pin portion 42. Thus, in the step of forming the foamed polyurethane layer, a through-hole penetrating in a vertical direction is formed at a position corresponding to the lower mold pin portion 41 and the upper mold pin portion 42. As shown in FIG. 3A, the through-hole can be used as the mounting hole 14 for mounting other components to the vehicle interior board 1.

That is, in the step of molding the vehicle interior board 1, the lower mold pin portion 41 and the upper mold pin portion 42 for positioning shown in FIG. 7A are used. In this way, the mounting holes 14 for mounting other components can be simultaneously formed in the vehicle interior board 1. Thus, it is not necessary to separately perform the step of forming the mounting holes 14 after molding the vehicle interior board 1. As a result, productivity of the vehicle interior board 1 is improved.

As shown in FIG. 7A, the upper mold pin portion 42 is formed to be shorter than the lower mold pin portion 41. This makes it easy to remove the upper mold 32 after molding. That is, since the upper mold pin portion 42 is formed to be short, as shown in FIGS. 5A to 5C, the upper mold 32 is connected to the lower mold 31 by the hinge portion 40 and is pivoted open in the form of a door. This facilitates demolding of the upper mold 32 side.

Further, the upper mold pin portion 42 and the positioning hole 17 shown in FIG. 7A only have to be provided in at least two places. This makes it possible to dispose the metal plate 12 at the accurate position. Therefore, for example, the upper mold pin portion 42 as the upper mold protuberance may not be formed in the upper mold 32. Instead, the lower mold 31 may be formed with the lower mold protuberance having a form which is fitted into the hole 17 formed in the upper mold 32 and abuts the substantially flat setting surface 36 of the upper mold 32. Also by forming the lower mold protuberance of such a form, in the step of forming the foamed polyurethane layer, it is possible to form the mounting hole 14 penetrating from the one outer surface 11a to the other outer surface 12a of the vehicle interior board 1 as shown in FIG. 3A.

Further, as exemplified in FIG. 3C, the mounting hole 14 is not necessarily required to be the through-hole. When the mounting hole 14 is a hole which does not pass through the outer surface 12a, it is not necessary to form the hole 17 shown in FIG. 7A in the metal plate 12. Further, the lower mold protuberance may be configured not to abut the upper mold 32.

As shown in FIGS. 3B and 3C, when the grommets 25, 26, or the like as the reinforcing member is provided in the mounting hole 14, as shown in FIG. 7A, in the step of setting the metal plate 11, the grommet 25 or the like is disposed to be fitted to the lower mold pin portion 41. Thus, it is possible to easily and accurately dispose the grommet 25 or the like in a predetermined position by utilizing the lower mold pin portion 41 for positioning.

The grommet 25 or the like disposed to be fitted to the lower mold pin portion 41 is fixed in the foamed polyurethane layer 13 in the step of forming the foamed polyurethane layer 13 (see FIG. 3B). Therefore, it is not necessary to separately mounting the reinforcing member for increasing the rigidity and strength near the mounting hole 14 in a subsequent step.

FIG. 7B is a cross-sectional view of a vicinity of a lower mold pin portion 45 which is another example of the lower mold protuberance. As shown in FIG. 7B, as at least one of the lower mold protuberances, the lower mold pin portion 45 which abuts the main surface corresponding to the inner surface 12b of the metal plate 12 disposed on the upper mold 32 side may be formed.

In this way, the lower mold pin portion 45 abutting the inner surface 12b of the metal plate 12 is formed. Thus, it is possible to set the two metal plates 11, 12 on the lower mold 31 with a predetermined gap therebetween. That is, as shown in FIG. 5A, the metal plate 12 on the upper mold 32 side can be set on the lower mold 31 instead of the upper mold 32 in a state where the upper mold 32 is opened. This makes it easy to set the metal plate 12. In addition, it is possible to reduce or omit the vacuum holes 39, the electromagnets or the like provided for holding the metal plate 12 in the upper mold 32.

FIG. 7C is a cross-sectional view showing a vicinity of a lower mold pin portion 47 as still another example of the lower mold protuberance. As shown in FIG. 7C, the lower mold pin portion 47 may be formed as at least one of the lower mold protuberances. The lower mold pin portion 47 has a step portion 48 abutting the inner surface 12b of the metal plate 12 disposed on the upper mold 32 side, and is fitted into the positioning hole 17 formed in the metal plate 12.

That is, a vicinity of an upper end of the lower mold pin portion 47 is reduced in diameter in a step shape. In the vicinity of the upper end, the step portion 48 abutting the inner surface 12b of the metal plate 12, and a protrusion 49 protruding from the step portion 48 and fitted into the hole 17 of the metal plate 12 are formed. Further, the upper mold 32 may be formed with a recess 50 into which the protrusion 49 at the upper end of the lower mold pin 47 is fitted.

With such a structure, in the step of setting the metal plates 11, 12, it is possible to set the two metal plates 11, 12 on the lower mold 31 at accurate positions with a predetermined interval. Further, it is possible to reduce or omit the vacuum holes 39, the electromagnets or the like of the upper mold 32.

FIG. 8A is a perspective view showing a vicinity of a handle hole forming portion 43 of the lower mold 31 of the molding apparatus 30. FIG. 8B is a cross-sectional view showing the vicinity of the handle hole forming portion 43 in a state where the metal plates 11, 12 are set to form the molding space 60.

As shown in FIG. 8A, the handle hole forming portion 43 as the lower mold protuberance for molding the handle hole 15 (see FIG. 4) is formed in the recess 34 of the lower mold 31. The handle hole forming portion 43 has a planar shape corresponding to a shape of the handle hole 15 and protrudes upward from the setting surface 35. A channel groove 44 which opens upward and penetrates from one side surface to the other side surface on an opposite side is formed on an upper surface of the handle hole forming portion 43.

As shown in FIG. 8B, in the step of molding the metal plates 11, 12, holes 18, 19 corresponding to the planar shape of the handle hole forming portion 43 are respectively formed in the metal plates 11, 12. In the step of forming the molding space 60, the metal plate 11 is set on the setting surface 35 of the lower mold 31 so that the hole 18 of the metal plate 11 disposed on the lower mold 31 side is fitted to the handle hole forming portion 43. Further, the reinforcing metal fitting 27 is placed on the metal plate 11 set on the lower mold 31 by utilizing the handle hole forming portion 43 for positioning.

Then, the metal plate 12 is set so that the hole 19 of the metal plate 12 disposed on the upper mold 32 side is also fitted to the handle hole forming portion 43. The upper surface of the handle hole forming portion 43 abuts the setting surface 36 of the upper mold 32 closed on the lower mold 31.

Then, in the step of forming the foamed polyurethane layer 13 (see FIG. 1), the liquid raw materials of the foamed polyurethane are injected into the molding space 60. Thus, as shown in FIGS. 4A and 4B, the handle hole 15 which penetrates from the one outer surface 11a to the other outer surface 12a of the vehicle interior board 1 and is reinforced by the reinforcing metal fitting 27 at a periphery thereof is formed.

Here, as described with reference to FIG. 8A, the channel groove 44 is formed on the upper surface of the handle hole forming portion 43. Therefore, as shown in FIG. 8B, in the state where the molding space 60 is formed, the channel groove 44 sandwiched between the lower mold 31 and the upper mold 32 is a space penetrating from the one side surface to the other side surface of the handle hole forming portion 43. In the step of forming the foamed polyurethane layer 13, the channel groove 44 is a channel through which the liquid raw materials of foamed polyurethane flow.

In this way, the channel groove 44 formed on the upper surface of the handle hole forming portion 43 is the channel of the liquid raw materials. Thus, it is possible to efficiently supply the liquid raw materials of the foamed polyurethane to a periphery of the handle hole forming portion 43. Therefore, it is possible to form the foamed polyurethane layer 13 of high quality with few defects such as voids.

Extra foamed polyurethane cured in the channel groove 44 is cut off from the vehicle interior board 1 after the step of forming the foamed polyurethane layer 13. An upper portion of the channel groove 44 is open. Therefore, it is also easy to remove the extra foamed polyurethane.

The present invention is not limited to the above embodiments. Various other modifications can be made without departing from the gist of the present invention.

The invention claimed is:

1. A method for manufacturing a vehicle interior board, comprising:
    a step of molding a pair of metal plates respectively into predetermined shapes;
    a step of applying an epoxy resin-based coating agent to main surfaces respectively corresponding to inner surfaces of the pair of metal plates with;
    a step of forming a molding space between the pair of metal plates by sandwiching the pair of metal plates between a lower mold and an upper mold so that the main surfaces corresponding to the inner surfaces coated with the coating agent face each other; and
    a step of forming a foamed polyurethane layer by reacting raw materials of foamed polyurethane injected into the molding space,
    wherein a setting surface, which has a planar shape larger than that of the metal plate and on which the metal plate is set so that an outer surface of the metal plate abuts the setting surface, is formed in each of the lower mold and the upper mold,
    lower mold protuberances protruding from the setting surface are formed in the lower mold,
    in the step of molding the metal plates, positioning holes are formed in the metal plate, and
    in the step of forming the molding space, the metal plate is set so that the positioning holes of the metal plate arranged on the lower mold side are fitted to the lower mold protuberances, and each of the pair of metal plates is disposed near a center of the setting surface,
    wherein the foamed polyurethane layer covers peripheral end portions of the metal plates, and the foamed polyurethane layer is formed flush with outer surfaces of the metal plates,
    wherein a chamfered portion is formed at a corner portion of the foamed polyurethane layer, and the chamfered portion is located outside the peripheral end portions of the metal plates, and
    a step of forming a handle hole through a handle hole forming portion, wherein the handle hole forming portion is located in a recess of the lower mold, wherein a channel groove, through which the raw materials of foamed polyurethane flow, is located on an upper surface of the handle hole forming portion.

2. The method for manufacturing the vehicle interior board according to claim 1, wherein
    in the step of forming the foamed polyurethane layer, mounting holes for mounting other components on the vehicle interior board are formed at positions corresponding to the lower mold protuberances.

3. The method for manufacturing the vehicle interior board according to claim 1, wherein
    at least one of the lower mold protuberances abuts the main surface corresponding to the inner surface of the metal plate disposed on the upper mold side.

4. The method for manufacturing the vehicle interior board according to claim 1, wherein
    at least one of the lower mold protuberances is formed to reach the upper mold, and
    in the step of molding the metal plates, the positioning hole is formed in the metal plate disposed on the upper mold side so as to correspond to a position of each of the at least one of the lower mold protuberances reaching the upper mold.

5. The method for manufacturing the vehicle interior board according to claim 4, wherein
    one or more upper mold protuberances protruding from the setting surface and abutting the lower mold protuberances are formed on the upper mold so as to correspond to each of the position of the at least one lower mold protuberances reaching the upper mold, and
    in the step of forming the molding space, the metal plate is set so that the positioning holes of the metal plate arranged on the upper mold side are fitted to the upper mold protuberances.

6. The method for manufacturing the vehicle interior board according to claim 4, wherein
    at least one of the lower mold protuberances reaching the upper mold has a step portion abutting the main surface corresponding to the inner surface of the metal plate disposed on the upper mold side, and a protrusion protruding from the step portion, wherein the protrusion is fitted into the positioning hole formed in the metal plate disposed on the upper mold side.

7. The method for manufacturing the vehicle interior board according to claim 1, wherein
    the setting surface of at least one of the upper mold and the lower mold is provided with a vacuum hole opening to the setting surface and a sealing member surrounding a periphery of the vacuum hole, and
    in the step of forming the molding space, an inside of the vacuum hole is depressurized, the metal plate is sucked in a region surrounded by the sealing member, and the metal plate set on the setting surface is held in the lower mold or the upper mold.

8. The method for manufacturing the vehicle interior board according to claim 1, wherein
    in the step of forming the molding space, a reinforcing member is disposed around the positioning hole fitted to the lower mold protuberance between the pair of metal plates,
    in the step of forming the foamed polyurethane layer, the reinforcing member is fixed in the foamed polyurethane layer.

9. The method for manufacturing the vehicle interior board according to claim 1, each metal plate is in a shape of a waveform.

10. The method for manufacturing the vehicle interior board according to claim 1, the chamfered portion is in a rounded shape.

* * * * *